April 21, 1936.  A. F. KELLER  2,038,495

ELECTRIC INSECT TRAP

Filed Jan. 5, 1935  2 Sheets-Sheet 1

Inventor
August F. Keller
by his Attorneys
Howson & Howson

April 21, 1936.　　　A. F. KELLER　　　2,038,495
ELECTRIC INSECT TRAP
Filed Jan. 5, 1935　　　2 Sheets-Sheet 2

Inventor
August F. Keller
by his Attorneys
Howson & Howson

Patented Apr. 21, 1936

2,038,495

UNITED STATES PATENT OFFICE 2,038,495

ELECTRIC INSECT TRAP

August F. Keller, Philadelphia, Pa.

Application January 5, 1935, Serial No. 567

11 Claims. (Cl. 43—112)

This invention relates to insect traps, and particularly to those designed for catching cockroaches and other insects provided with feelers by which the insect detects danger in its advance over any surface upon which it may be walking.

The present invention is directed to that type of trap in which an electric current is employed to stun, to paralyze or kill the insect, depending upon the intensity of the current used.

In traps of the above noted electric type constructed in accordance with the knowledge of the prior art the two opposite sides of the electric circuit were respectively connected to a pair of circuit plates disposed in side by side relation to each other in a common plane with either a narrow gap or strip of insulating material disposed between the plates, the theory being that an insect in walking over one of the plates and stepping upon the other of the plates would complete the circuit through its body and thereby inflict its own destruction.

Such traps have been notoriously inefficient in catching insects provided with antenna for the reason that the insect in standing on one of the circuit plates and working its feelers in advance of its movement receives a slight shock or sensation when the tips of the feelers engage the second of the circuit plates. The feelers, however, due to the light sensitive touch, do not conduct sufficient current into the insect's body to produce the desired effect but only sufficient to warn the insect of the danger ahead, as a result of which the insect instinctively retreats.

The principal object of the present invention is to arrange the circuit plates or equivalent elements in such relation to each other as to prevent one of the conductors from being engaged by the sensitive antenna of the insect as the insect advances over the other of the conductors but in such relation to each other that the insect in advancing toward the bait within the trap must simultaneously engage both conductors.

Other objects, the construction and the operation of the device forming the subject of the present invention will be fully disclosed hereinafter, reference being had to the accompanying drawings; of which:

Figure 1:
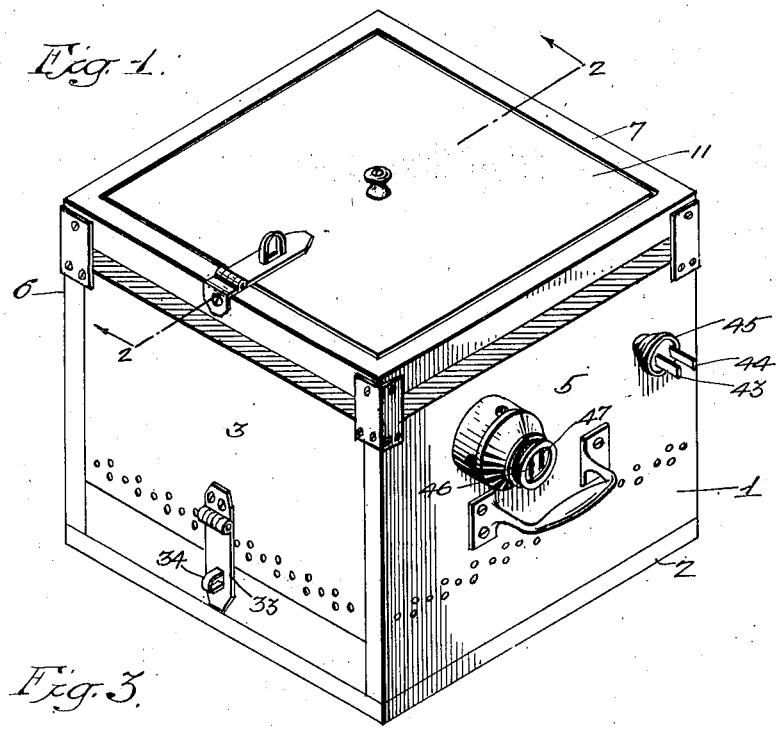
Fig. 1 is a perspective view of a trap made in accordance with the principles of the present invention.

As shown in the drawings, the device comprises a box-like structure 1 which may be composed of sheet metal, wood or any desired material, said enclosure comprising a bottom 2, a front wall 3, a back wall 4, side walls 5 and 6, and a top 7, said top being spaced vertically above the upper edges 8 of the front, back and side walls to provide an insect entrance 10. The top 7 is provided with a removable lid 11 which is supported by brackets 12, 12 and is provided with lugs 13 which extend under the marginal portion of the top 7 to prevent the one side of the cover 11 from being raised with respect to the top 7.

The opposite side of the cover 11 is provided with a keeper 14 with which cooperates a hinged hasp 15 having the one portion 16 secured to the marginal portion of the top 7, said keeper being arranged to receive a padlock by which the cover 11 is secured against removal.

Figure 3:
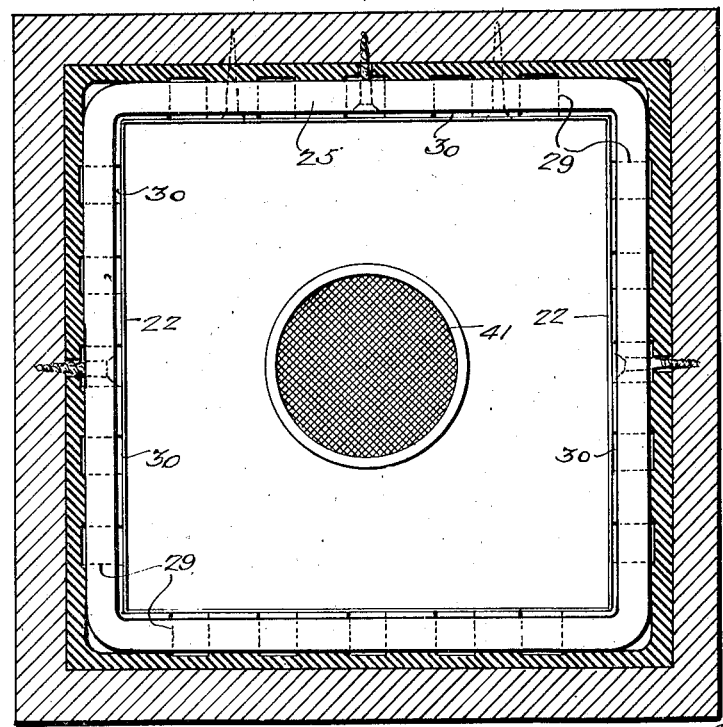
Fig. 3 is a sectional plan view taken on the line 3—3, Fig. 2.
Figure 2:
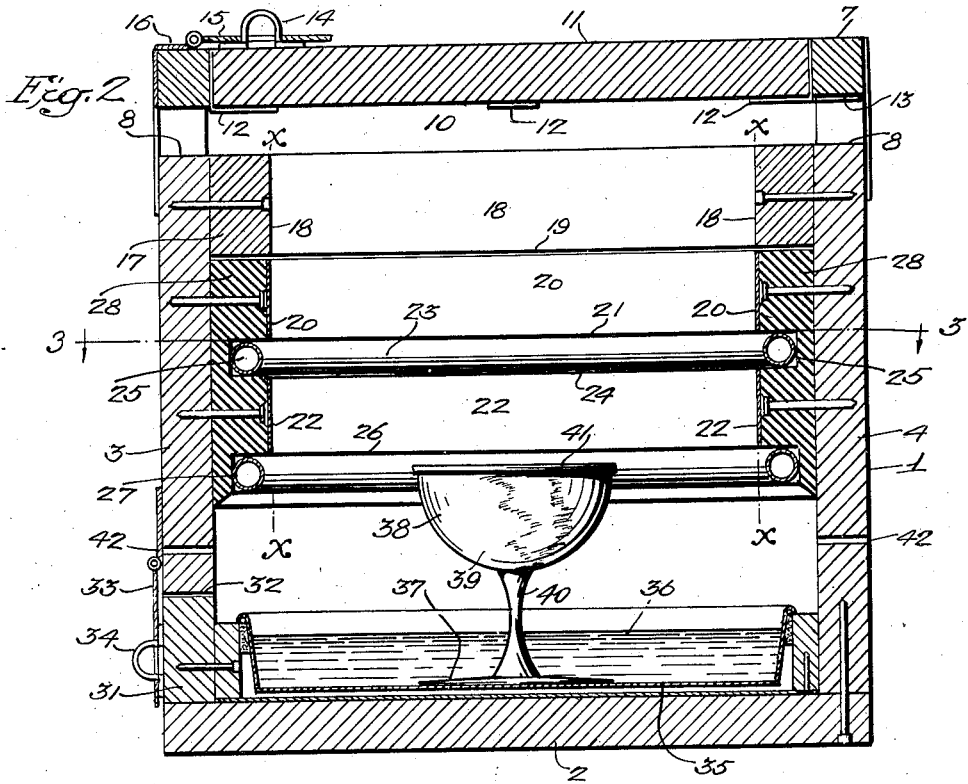
Fig. 2 is a vertical sectional elevation taken on the line 2—2, Fig. 1.

Secured to or forming part of each of the front, back and side walls on the inner surface and adjacent the upper edge 8 thereof is a lateral extension 17 of said walls providing a relatively deep vertically arranged insect promenade 18. Directly below and substantially parallel to the lower edge 19 of the surface 18 is a current-conducting plate 20 which extends around the four walls of the device, as clearly shown in Fig. 3. Below the plate 20 and spaced from the lower edge 21 thereof and in the same plane with the plate 20 is a second plate 22.

Figure 4:
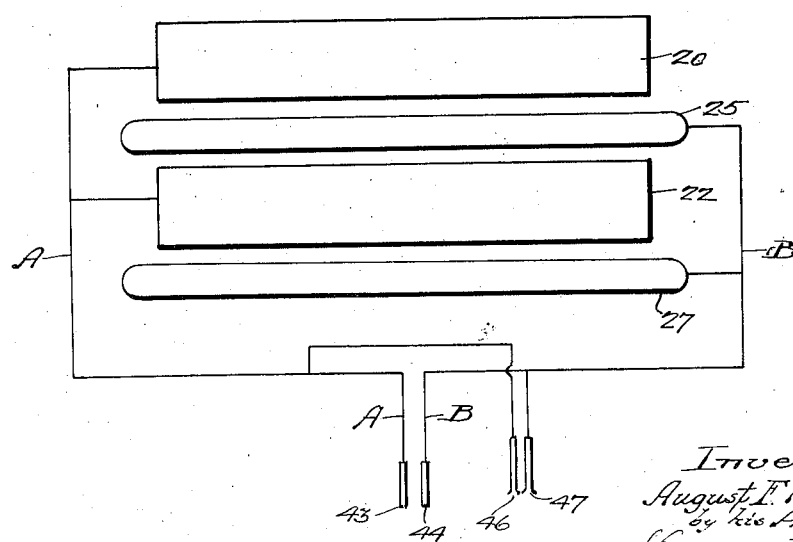
Fig. 4 is an electrical diagram illustrating the connections between the circuit members.

As shown in Fig. 4, both the plates 20 and 22 are connected to one side A of the electric circuit of the device. In the space 23 between the lower edge 21 of the plate 20 and the upper edge 24 of the plate 22 and set below the common plane x—x of the surfaces 18, 20 and 22 is a conductor 25 which, like the plates 20 and 22, extends around the four sides of the device.

Directly below the lower edge 26 of the plate 22 and set back from the common plane x—x of the surfaces 18, 20 and 22 is a second conductor 27 of the same type as the conductor 25, said conductors 25 and 27, as clearly shown in Fig. 4, being both connected to the second side B of the electric circuit of the device. Obviously, the conductors 25 and 27 may be in the form of flat plates, the same as the plates 20 and 22. However, it is preferred that the conductors 25 and 27 be of a circular cross section, or at least of a cross section having an arcuate surface, whereby the B current conductors may be brought relatively close to the plane of the x—x of the A circuit conductors without causing sparking between the conductors and for other reasons which will be more fully disclosed hereinafter.

The conductors 20, 22, 25 and 27 are supported by suitable brackets, blocks, strips or other suitably shaped pieces of insulating material 28 which in turn are secured in any suitable manner to the four walls of the device. In the present instance, the supports 28 are in the form of strips which are provided with laterally spaced vertically extending grooves 29 forming suitable recesses 30 for purposes hereinafter described.

In the lower portion of the casing 1 and slidably mounted on the bottom 2 thereof in the present instance is a drawer 31 which is inserted or removed from the interior of the casing 1 through a slot 32 formed in the front wall 3 of the device, a hasp 33 and keeper 34 being provided whereby the drawer may be secured by a padlock passing through the keeper 34. Within the drawer 31 is a pan 35 which contains a suitable liquid 36, in the present instance plain water.

Seated within the pan 35 is the base 37 of a bait container 38. The bait container in the present instance is preferably in the form of a sherbet glass having a bowl 39 supported from the base 37 by a narrow thin stem 40. The bait container 38 is preferably provided with a screened or other perforated lid 41 which may be readily removed for cleaning and replenishing. The bowl 39 of the container 38 is preferably filled or partially filled with a liquid bait, such for example as that described in the applicant's copending application Serial No. 677,529, filed June 24, 1933.

The four walls of the device intermediate the top of the drawer 31 and the bottom of the supports 28 are provided with a series of perforations 42, through which and the entrance 10 the odor emanating from the bait in the container 38 may pass from the interior of the casing 1 into the room or other place in which the device is installed.

Connected with the sides A and B of the electric circuit are prongs 43 and 44 respectively which project outside the casing 1 and which may be connected to a source of current, such as ordinary house current, by means of any suitable flexible conductor provided with a socket and terminals into which the prongs 43 and 44 of the plug 45 may be inserted.

Connected in parallel with the sides A and B of the electric circuit of the device is a pair of terminals 46 and 47 which are adapted to receive the ordinary prongs of an ordinary push plug through which and by means of any suitable connector a number of the devices disclosed may be connected as a battery, or whereby the prongs of a plug at one end of a suitable conductor having at its opposite end a socket and an electric bulb may be inserted to determine at any time whether or not the device is electrically charged. Cockroaches and other insects naturally infest dark places, and the light connection above noted may be employed when cleaning the device without necessitating the removal of the devices as a whole from the place of installation.

Actual observation of the device in operation indicates that the odor of the bait permeating the atmosphere in which the device is located attracts the insects and entices them to crawl up the outer surface of the four walls of the device, over the upper edges 8 thereof, through the entrance 10 and down the promenade surface 18. The insect with its feelers outstretched in advance of its movements inspects the surface of the conductor plate 20 and upon receiving no warning of danger advances on to the plate 20. While walking on the plate 20 the insect reaches across the gap 23 between the lower edge 21 of the plate 20 to the upper edge 24 of the plate 22 and feels the surface of the plate 22. The two plates being in the same general plane and the conductor 25 being below the plane of said plates with the insect above the edge 21 of the plate 20 does not, as has been observed, feel down into the gap 23 but across the gap to the plate 22, the plate 22 being connected to the same side of the electric circuit as the plate 20 presents no alarm to the insect whereupon the insect advances to the lower edge 21 of the plate 20.

In order to cross the gap 23 the insect notes upon reaching the edge 21 the presence of the curved surface of the conductor 25 and immediately steps off the edge 21 of the plate 20 on to the conductor 25, the conductor 25 being connected to the opposite side of the electric circuit from the plate 20 and the insect having one or more feet on the conductor 25 while one or more feet still remain on the plate 20 causes the current to pass through the body of the insect thereby stunning or paralyzing the insect and causing it to drop into the liquid 36 in the pan 35 in the bottom of the casing 1. In most instances ordinary house current produces a paralysis which lasts from one-half to one minute and the insect lying in the liquid for such a length of time drowns during the period of paralysis or immediately upon recovering therefrom as it attempts to get out of the liquid.

In some instances, particularly with larger insects which may cross the gap 23 without contacting the conductor 25, the insect will advance over the plate 22 to the lower edge 26 thereof and in order to get to the bottom of the casing 1 the insect must advance across the conductor 27 whereupon the circuit will be completed between the conductors 22 and 27 with the above noted result. However, should the insect sense the danger it will, through instinct, retreat rapidly without the use of its feelers to detect danger to its rear, in which case observation has shown that the insects will unconsciously step into the gap 23 with their hind feet while their front feet remain in contact with the plate 22, thus effecting the above noted result.

In other instances an insect, while on the plate 22 and detecting the danger from the conductor 27, will attempt to turn around to walk up the surface over which it has advanced. When alarmed the instinct of a cockroach is to take shelter in any crevice that may be at hand and to do it quickly, and for this purpose the recesses 30 are provided. The recesses 30 provide the shelter desired by the roach but in crawling into any one of the recesses 30 the roach must of necessity contact two of the conductors which are respectively connected to opposite sides of the circuit whereupon the desired effect is attained.

Comparative tests between devices of the present invention and devices of the prior art as above noted under identical circumstances have shown an efficiency ratio of approximately one to fifteen and upwards in favor of the device forming the subject of the present invention.

While the device has been described above as being provided with the liquid by which drowning of the paralyzed insects is accomplished, obviously such liquid may be eliminated in which case the insects will remain alive within the casing 1, any attempt to escape being prevented by reason of the necessity of the insects to advance upwardly over the conductors 21, 22, 25 and 26 and during any such attempt on the part of the insect to leave the device, observation has shown the insect's contact simultaneously with two of the opposed circuit conductors, causing repeated paralysis of the insects and resulting in their tumbling back into the base of the casing.

While the device has been described as using a liquid bait, any suitable bait in solid, powdered or plastic form may be used without departing from the spirit of the invention; and while the casing or enclosure 1 has been disclosed as being of a square form in plan obviously the enclosure may be of any desired shape, i. e. round, oblong, elliptical or polygonal in plan, and the walls while disclosed as being substantially vertical may obviously be at an angle to the base in either converging or diverging relation to each other.

What I claim is:

1. An insect trap comprising a substantially vertically walled enclosure, a plurality of plates extending completely around the enclosure in vertically spaced relation, the plates on a side of the enclosure being in a substantially common vertical plane within said enclosure, a plurality of electrical conductors respectively disposed between and adjacent the edges of said spaced plates in a plane intermediate the common planes of the plates and the adjacent wall of the enclosure, and an electric circuit having one side connected to each and all of said plates and its opposite side connected to each and all of said conductors.

2. An insect trap comprising a substantially vertically walled enclosure, a plurality of plates extending completely around the enclosure in vertically spaced relation and in alignment within said enclosure, a plurality of electrical conductors respectively disposed between and adjacent the edges of said spaced plates and positioned intermediate the plates and the wall of the enclosure, supports for said plates and said conductors carried by the closure walls, and an electric circuit having one side connected to each and all of said plates and its opposite side connected to each and all of said conductors.

3. An insect trap comprising a substantially vertically walled enclosure, a plurality of plates extending completely around the enclosure in vertically spaced relation and in alignment within said enclosure, a plurality of electrical conductors respectively disposed between and adjacent the edges of said spaced plates and positioned intermediate the plates and the wall of the enclosure, supports for said plates and said conductors carried by the enclosure walls, said supports affording recesses behind said plates and adjacent said conductors, and an electric circuit having one side connected to each and all of said plates and its opposite side connected to each and all of said conductors.

4. An insect trap comprising a substantially vertically walled enclosure, a plurality of plates extending completely around the enclosure in vertically spaced relation and in alignment within said enclosure, a plurality of electrical conductors respectively disposed between and adjacent the edges of said spaced plates and positioned intermediate the plates and the wall of the enclosure, an electric circuit having one side connected to each and all of said plates and its opposite side connected to each and all of said conductors, and a bait container disposed within said enclosure in widely spaced relation to said plates.

5. An insect trap comprising a substantially vertically walled enclosure, a plurality of plates extending completely around the enclosure in vertically spaced relation and in alignment within said enclosure, a plurality of electrical conductors respectively disposed between and adjacent the edges of said spaced plates and positioned intermediate the plates and the wall of the enclosure, an electric circuit having one side connected to each and all of said plates and its opposite side connected to each and all of said conductors, a liquid container within the enclosure below said plates and conductor, and a bait container above the liquid in said liquid container and in widely spaced relation to said plates.

6. An insect trap comprising a substantially vertically walled enclosure, a plurality of plates extending completely around the enclosure in vertically spaced relation and in alignment within said enclosure, a plurality of electrical conductors respectively disposed between and adjacent the edges of said spaced plates and positioned intermediate the plates and the wall of the enclosure, an electric circuit having one side connected to each and all of said plates and its opposite side connected to each and all of said conductors, and a bait container disposed within said enclosure in widely spaced relation to said plates, said enclosure being provided with openings insufficient in size to permit entrance or exit of insects to permit escape of bait odor from said enclosure and a relatively larger insect entrance opening in a plane above that of the uppermost of said plates.

7. An insect trap comprising a substantially vertically walled enclosure, a plurality of plates extending completely around the enclosure in vertically spaced relation and in alignment within said enclosure, a plurality of electrical conductors respectively disposed between and adjacent the edges of said spaced plates and positioned intermediate the plates and the wall of the enclosure, an electric circuit having one side connected to each and all of said plates and its opposite side connected to each and all of said conductors, a bait container disposed within said enclosure in widely spaced relation to said plates, and a perforated cover on said bait container, said enclosure being provided with openings insufficient in size to permit entrance or exit of insects to permit escape of bait odor from said enclosure and a relatively larger insect entrance opening in a plane above that of the uppermost of said plates.

8. An insect trap comprising a substantially vertically walled enclosure having a closed bottom and a closed top, a plurality of electrical conductor plates extending completely around and within the enclosure, the plates on a side of the enclosure being in a common plane spaced from the enclosure walls and in vertically spaced relation to each other and to said enclosure bottom, a plurality of electrical conductors respectively disposed between and adjacent the edges of said plates intermediate said common planes and said adjacent walls, said plates and said conductors being connected to opposite sides respectively of an electrical circuit, said trap having an insect entrance slot in the enclosure walls above the uppermost of said electrical conductors, a bait container in the bottom of said enclosure, and a removable door in said trap top affording access to said bait.

9. An insect trap comprising a substantially vertically walled enclosure having a closed bottom and a closed top, a plurality of electrical conductor plates extending completely around and within the enclosure, the plates on a side of the enclosure being in a common plane spaced from the enclosure walls and in vertically spaced relation to each other and to said enclosure bottom, a plurality of electrical conductors respectively disposed between and adjacent the edges of said plates intermediate said common planes and said adjacent walls, said plates and said conductors being connected to opposite sides respectively of an electrical circuit, said trap having an insect entrance slot in the enclosure walls above the uppermost of said electrical conductors, a liquid container in the bottom of the enclosure and removable from the enclosure through a normally closed opening in the side wall thereof, a bait container in said liquid container, and a removable door in said enclosure top affording access to said bait container.

10. An insect trap comprising a plurality of plates extending in vertically spaced relation in a substantially common vertical plane, a plurality of electrical conductors respectively disposed between the adjacent edges of said spaced plates in a plane parallel to and offset from the common plane of the plates, and an electrical circuit having one side connected to each and all of said plates and its opposite side connected to each and all of said conductors.

11. An insect trap comprising a plurality of plates extending in spaced relation in a substantially common plane, a plurality of electrical conductors respectively disposed between the adjacent edges of said spaced plates in a plane parallel to and offset from the common plane of the plates, and an electrical circuit having one side connected to each and all of said plates and its opposite side connected to each and all of said conductors.

AUGUST F. KELLER.